Dec. 23, 1952  H. SMITH  2,622,261
WINDSHIELD WIPER WITH AIR AND WATER SUPPLY
Filed Sept. 24, 1949  2 SHEETS—SHEET 1
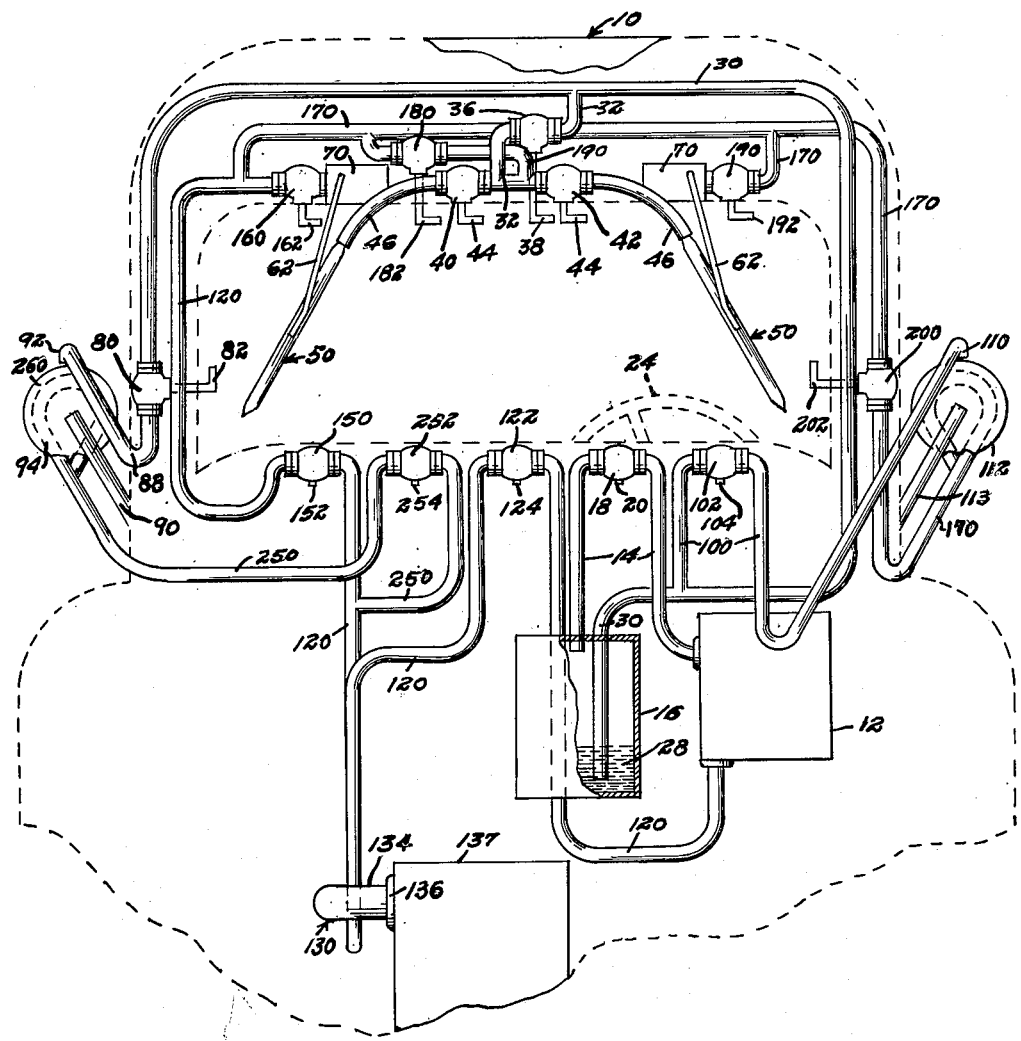
Fig_1_
Inventor
Howard Smith
By Arthur H. Sturges
Attorney Dec. 23, 1952 H. SMITH 2,622,261
WINDSHIELD WIPER WITH AIR AND WATER SUPPLY
Filed Sept. 24, 1949 2 SHEETS—SHEET 2
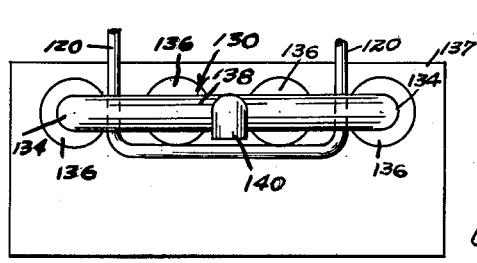
Fig-2-
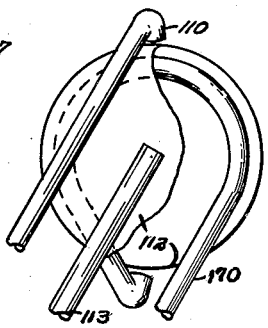
Fig-3-
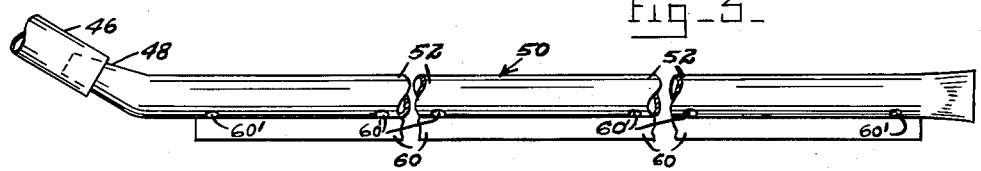
Fig-4-
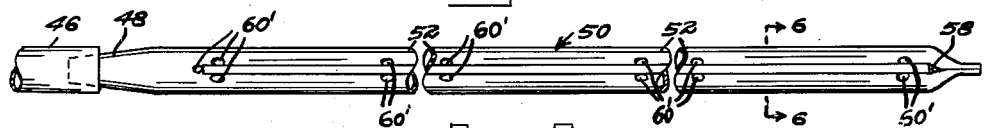
Fig-5-
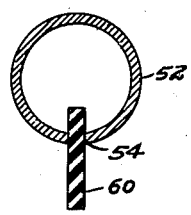
Fig-6-
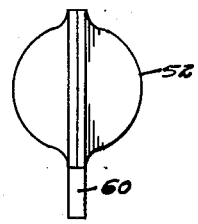
Fig-7-
Inventor
Howard Smith
By Arthur H. Sturges
Attorney Patented Dec. 23, 1952

2,622,261

UNITED STATES PATENT OFFICE 2,622,261

WINDSHIELD WIPER WITH AIR AND WATER SUPPLY

Howard Smith, Alliance, Nebr.

Application September 24, 1949, Serial No. 117,563

1 Claim. (Cl. 15—250.4)

This invention relates to windshield-wipers for automotive vehicles and more particularly it is an object of the invention to provide a windshield-wiper which is adapted to conduct hot air to a windshield for defrosting the same.

Another object of this invention is to provide means for conducting hot air to the windshield of a vehicle.

Still another object of the invention is to provide means for conducting washing water to the windshield of a vehicle.

A further object of the invention is to provide a device for the above stated purposes, which can be employed on railway locomotives, aeroplanes, street cars, motor boats and the like with equal facility with respect to an employment thereof on an automobile or truck.

Another object of the invention is to provide a device for the purpose described which is sturdy and durable in construction, reliable and efficient in operation, and relatively simple and inexpensive to manufacture, assemble and utilize.

Other and still further objects and advantages of the invention will become apparent from the following detailed description of a preferred embodiment thereof.

In the drawings:

Figure 1 is a frontal elevation of the windshield and rear-view mirror washing and defrosting systems of this invention. The system is shown as applied to a truck, portions of the rearview mirrors of the truck and of the body thereof being shown in full lines, other portions being shown in dotted lines, the manifold and compressed-air tank of the truck being shown in full lines. A water reservoir of this invention is shown in broken lines.

Figure 2 is a side elevation of the manifold of Figure 1 together with a portion of the hot air duct of the invention.

Figure 3 is a frontal elevation of a rear-view mirror of the truck together with portions of the water duct and hot air duct of the invention, a forward portion of the wall or casing of the mirror being broken away together with the inner end of the mirror post.

Figure 4 is a side elevation of the windshield-wiper of this invention shown with portions thereof broken away and with an end portion only of a hot air and water hose attached thereto.

Figure 5 is a bottom plane view of the wiper as shown in Figure 4.

Figure 6 is a view-in-section taken along the line 6—6 of Figure 5.

Figure 7 is a right end view of the wiper as seen from the right-hand side of Figure 1.

The washing and defrosting system of this invention is particularly adapted for use on a truck such as is generally indicated at 10 in Figure 1, the truck being almost completely shown in dotted lines.

The truck 10 is preferably one of the type having a compressed-air tank 12. The tank 12 has a compressed-air outlet pipe 14 which latter extends to and opens into a water reservoir 16.

A valve 18 is provided in the line 14 and the valve 18 is preferably at any convenient position on the dashboard of the truck with its handle 20 within reach of the operator sitting behind the steering-wheel 24, shown in dotted lines.

The reservoir 16 has a supply of water 28 therein and a water pipe 30 is provided extending downwardly through the top of the container 16 and opening at a position near the bottom thereof. The pipe 30 extends upwardly along the side wall of the truck and across the top of the truck as seen in Figure 1.

The pipe 30 is provided with a portion 32 having a valve 36 therein. The valve 36 is provided with a control handle 38 disposed within reach of the driver and from the valve 36 the portion 32 extends to a header having valves 40 and 42 at the ends and the valves are provided with handles 44. The valves 40 and 42 are disposed for controlling the flow of water through the portion 32 to two flexible hoses 46 which latter are attached to the open ends 48 of two elongated hollow windshield-wipers 50.

The wipers 50 are each provided with a tubular section or arm 52, as best seen in Figures 4 and 5. The section 52 has a slit 54 down its center for receiving a resilient elongated member 60 which acts as a squeegee to engage the windshield and wipe the water therefrom. It will be seen that the tubular portion 52 presses against and securely holds the member 60.

The forward end of the tube 52 is closed, being pinched together in a manner leaving a water outlet hole 58 of triangular shape.

A plurality of pairs 60 of water outlet holes are provided in the tube 52 and are disposed in spaced apart positions along the length thereof. Each hole 60 of a pair is disposed on an opposite side of the squeegee member 60 from the other hole of the pair.

The windshield-wipers 50 are attached to oscillating arms or levers 62 of conventional construction and the latter are secured to air-motors 70 such as are conventionally used on trucks.

The water line 30 extends past the portion 32 to the opposite side of the truck where it joins a valve 80 having a control handle 82. On the other side of the valve 80 the water pipe 30 is provided with a portion 88 which extends outwardly alongside the mirror post 90 and is downturned on its rearward end as shown at 92 for causing water to cascade downwardly across the face of the mirror 94.

The pipe 30 is further provided with a portion 100 which opens upon the main portion of the pipe 30 adjacent the tank 16. The portion 100 is provided with a valve 102 therein having a control handle 104. The rearward end of the portion 100 is disposed down-turned as at 110 for directing washing water on the rearward side of the opposite rear-view mirror 112.

The invention further includes an air duct 120 which extends from the container 12 to a valve 122 having a control handle 124. The duct 120 then extends to the right-hand side of the truck and extends downwardly between two end outlet ports of the exhaust manifold 130, the ports having outwardly extending pipe portions 134 and gaskets 136, adjacent the motor 137.

The manifold pipes 134 lead to a mixing pipe 138 as is conventional and the latter leads through a fitting 140 to the exhaust of a truck, not shown but conventional. The hot air duct 120, after entwining around the manifold pipes 134, extends upwardly to a valve 150 having a handle 152, and from there extends through a valve 160, having a handle 162, to one of the air motors 70 for driving the same. Another portion of the duct 120 is shown at 170 and extends from the main section 120 through a valve 180, having a handle 182, through a duct portion 190 and to the header of the pipe 32 which is disposed between the valves 36, 40, and 42.

Another portion of the duct 170 extends through a valve 190, having a control lever 192, to the opposite air motor 70 of the other windshield-wiper 50.

The hot air duct portion 170 also extends through a valve 200, having a lever 202, to the left-hand rear-view mirror 112, coiling about inside the housing of the mirror and forwardly of the glass portion thereof, as best seen in Figure 3. The terminal end of the duct 170 is preferably disposed upturned in a manner for throwing hot air upon the rearward side of the mirror. The mirror 112 is provided with a post 113 for attaching the same to the truck.

The hot air duct 120 is further provided with a branch 250 which opens upon the main body portion of the duct 120 on the rearward side of the exhaust manifold. A valve 252 having a control lever 254 is provided in the duct 250 and the duct 250 winds similarly about the rear-view mirror 260 on the opposite side of the truck, being also disposed for directing hot, defrosting air upon the rearward side of the mirror 260. The hot air is directed upwards for utilizing the action of gravity in directing its flow.

In operation, it will be seen that the operator of a truck equipped with this invention can direct hot, defrosting air upon the rear-view mirrors by maintaining the valves 122, 150, and 200 open. The operator can direct hot air on the windshield by maintaining the valves 122, 150, and 180 open together with the valves 40 and 42.

The operator can cause the mirrors to be defrosted by opening the valves 200 and 252 whenever the valve 122 is open. If desired, all hot air valves can be opened for normal use, the only control used being the valve 122.

For directing washing water at the windshield, the valves 18, 36, 40, and 42 should be kept open.

For directing washing water at the rear-view mirrors, the valves 18, 102, and 80 should be maintained open.

It will be seen that this invention uses compressed air for forcing water from the water reservoir 16 and employs the extreme heat of the exhaust manifold for heating defrosting air.

From the foregoing description it is thought to be obvious that a windshield-wiper constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as claimed.

I claim:

In a motor vehicle windshield cleaner, the combination which comprises windshield wiper motors for use on the upper edge of a windshield, reciprocating wiper levers operatively connected to said motors, tubular arms having strips of resilient material mounted therein carried by said levers, said tubular arms having spaced pairs of outlet openings positioned at the sides of said strip of resilient material, a header having valves in the ends also adapted for use on the upper edge of a windshield, flexible tubes extended from the ends of the header and connected to said tubular arms for supplying air or water, selectively, to said arms, tubes for connecting said header and wiper motors to the intake manifold of an engine of a vehicle in which the windshield is positioned, a water tank, means connecting the water tank to said header, a compressed air supply container, means for connecting the container to the water tank and also to the intake manifold for selectively supplying air and water to said header, said connection from the tank and container being positioned to receive heat from an exhaust manifold of said engine, and control valves in said connections.

HOWARD SMITH.

REFERENCES CITED

The following references are of record in the file of this patent:

UNITED STATES PATENTS

| Number | Name | Date |
|---|---|---|
| 1,145,159 | Marsh | July 6, 1915 |
| 1,448,508 | Thum | Mar. 13, 1923 |
| 1,843,828 | McNaught | Feb. 2, 1932 |
| 1,857,419 | Williams | May 10, 1932 |
| 1,982,345 | Kirby | Nov. 17, 1934 |
| 2,173,021 | Longwell | Sept. 12, 1939 |